United States Patent
Tsirkin et al.

(10) Patent No.: US 10,725,807 B2
(45) Date of Patent: Jul. 28, 2020

(54) PAGE TABLE ENTRY CACHING FOR VIRTUAL DEVICE EMULATION

(71) Applicant: Red Hat Israel, Ltd., Raanana (IL)

(72) Inventors: Michael Tsirkin, Yokneam Yillit (IL); Paolo Bonzini, Turate (IT)

(73) Assignee: Red Hat Israel, Ltd., Raanana (IL)

( * ) Notice: Subject to any disclaimer, the term of this patent is extended or adjusted under 35 U.S.C. 154(b) by 257 days.

(21) Appl. No.: 15/293,045

(22) Filed: Oct. 13, 2016

(65) Prior Publication Data
US 2018/0107607 A1    Apr. 19, 2018

(51) Int. Cl.
| G06F 9/455 | (2018.01) |
| G06F 12/1009 | (2016.01) |
| G06F 12/1045 | (2016.01) |
| G06F 12/1081 | (2016.01) |
| G06F 12/1027 | (2016.01) |

(52) U.S. Cl.
CPC ...... *G06F 9/45558* (2013.01); *G06F 12/1009* (2013.01); *G06F 12/1027* (2013.01); *G06F 12/1063* (2013.01); *G06F 12/1081* (2013.01); *G06F 2009/45579* (2013.01); *G06F 2009/45583* (2013.01); *G06F 2212/1052* (2013.01); *G06F 2212/152* (2013.01); *G06F 2212/68* (2013.01)

(58) Field of Classification Search
CPC ............................. G06F 12/145; G06F 12/109
See application file for complete search history.

(56) References Cited

U.S. PATENT DOCUMENTS

| 8,166,276 | B2 | 4/2012 | Serebrin |
| 8,479,295 | B2 | 7/2013 | Sahita et al. |
| 9,032,398 | B2 | 5/2015 | Ahmad et al. |
| 9,335,943 | B2 | 5/2016 | Sahita et al. |
| 9,372,807 | B2 | 6/2016 | Bennett et al. |
| 2002/0016812 | A1* | 2/2002 | Uchishiba ............. G06F 9/5077 718/104 |
| 2008/0016315 | A1* | 1/2008 | Cohen .................. G06F 12/1036 711/207 |
| 2009/0007103 | A1* | 1/2009 | Bennett ............... G06F 9/45558 718/1 |
| 2014/0380009 | A1 | 12/2014 | Lemay et al. |

(Continued)

OTHER PUBLICATIONS

Anonymous. [EPT][BOCHS] Do I Need to do an Invept on VMEXIT?. Retrieved from <forum.osdev.org/viewtopic.php?f=1&t=27422>, posted on Nov. 20, 2016, accessed Oct. 12, 2016. 2 pages.

(Continued)

*Primary Examiner* — William B Partridge
*Assistant Examiner* — Eric T Loonan
(74) *Attorney, Agent, or Firm* — Lowenstein Sandler LLP

(57) ABSTRACT

A hypervisor configures a page table entry in a host page table to map an address associated with memory-mapped input-output (MMIO) for a virtual device of a guest of the hypervisor to an input/output (I/O) instruction. The address is marked in the page table entry as a hypervisor exit entry, and the page table entry to cause an exit to the hypervisor responsive to the guest attempting to access the address. Responsive to detecting an exit to the hypervisor caused by the guest attempting to access the address, the hypervisor receives the I/O instruction mapped to the address that caused the exit. The hypervisor then executes the I/O instruction on behalf of the guest.

19 Claims, 5 Drawing Sheets

(56) References Cited

U.S. PATENT DOCUMENTS

2015/0100791 A1    4/2015  Chen et al.
2015/0149997 A1*  5/2015  Tsirkin ................ G06F 9/45558
                                                              718/1

OTHER PUBLICATIONS

Anonymous. The x86 kvm Shadow mmu. Retrieved from <kernel.org/doc/Documentation/virtual/kym/mmu.txt>. accessed on Jul. 4, 2016. 7 pages.

GLEW. Caching Invalid Entries in TLB. Retrieved from <sites.google.com/site/paulclaytonplace/andy-glew-s-comparch-wiki/caching-invalid-entries-in-tlb>. accessed on Aug. 1, 2010. 4 pages.

\* cited by examiner

PAGE TABLE ENTRY CACHING FOR VIRTUAL DEVICE EMULATION

TECHNICAL FIELD

The present disclosure is generally related to computer systems, and more particularly, to caching page table entries in virtualized computer systems.

BACKGROUND

A virtual machine (VM) is an emulation of a computer system. When executed on appropriate hardware, a VM creates an environment allowing the virtualization of an actual physical computer system (e.g., a server, a mainframe computer, etc.). The actual physical computer system is typically referred to as a "host machine." Typically, a component on the host machine known as a "hypervisor" (or a "virtual machine monitor") manages the execution of one or more virtual machines or "guests", providing a variety of functions such as virtualizing and allocating resources, context switching among virtual machines, etc. The operating system (OS) of the virtual machine is typically referred to as the "guest operating system" or "guest OS." In some implementations, the guest OS and applications executing within the guest OS can be collectively referred to as the "guest."

A virtual machine may access a virtual device using guest page addresses corresponding to memory space assigned to the virtual device for purposes of communicating with the virtual device, which is known as memory-mapped input/output (MMIO). The hypervisor may expose a virtual device to the guest to permit the guest to execute instructions on the virtual device. If a virtual device is a virtual peripheral device, such as a virtual printer or virtual video card, the virtual device may be accessed using memory mapped input-output (MMIO).

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
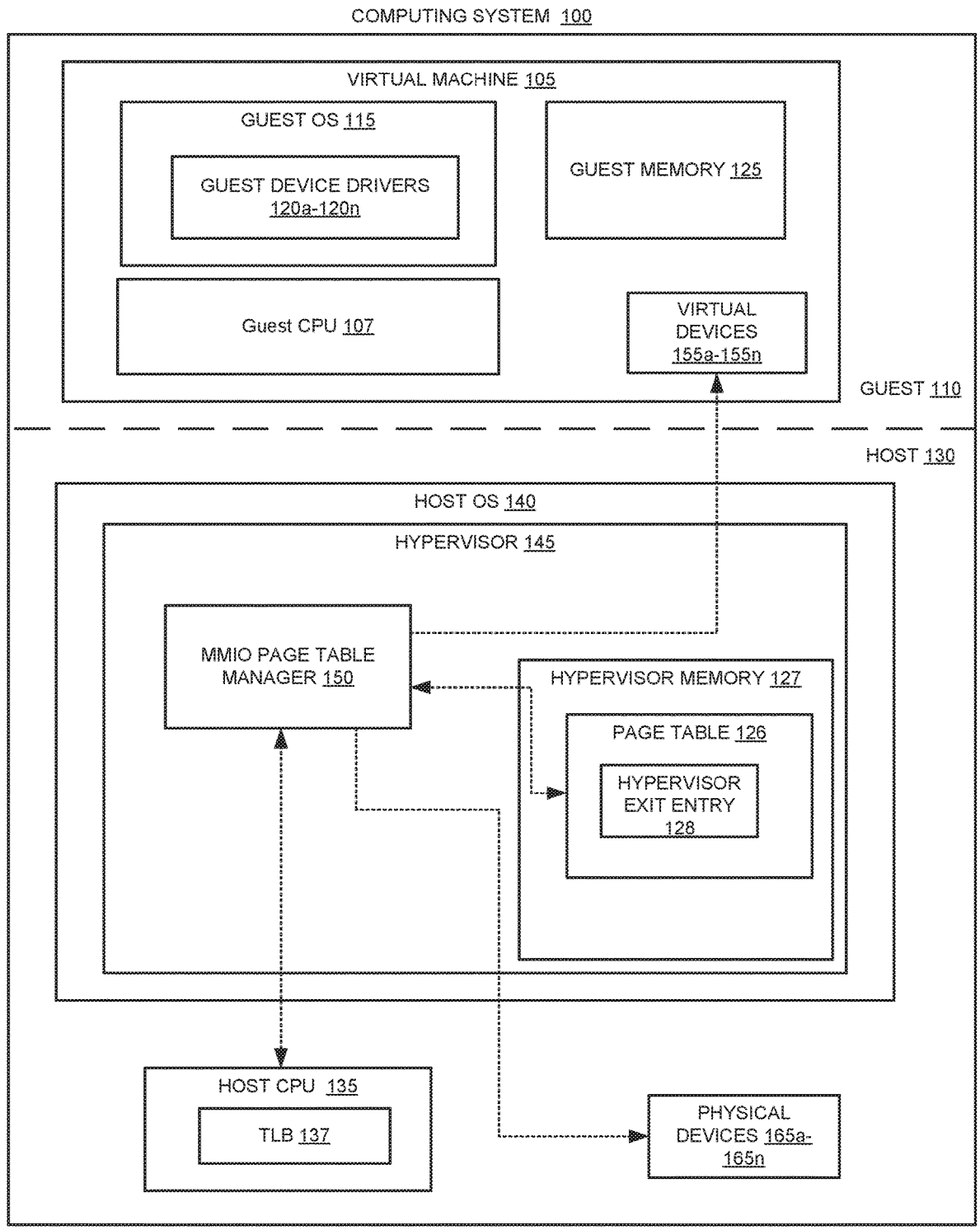
FIG. 1 depicts a high-level component diagram of an example computer system architecture, in accordance with one or more aspects of the present disclosure.

Described herein are methods and systems for page table entry caching for virtual device emulation. In virtualized systems, a hypervisor may expose a virtual device to a guest to permit the guest to execute instructions on the virtual device. For example, the guest may be associated with a networking interface card (NIC) via a virtual device of the guest, and the guest may execute an MMIO instruction to send a packet on the network attached to the NIC. During execution of an MMIO-based instruction, a guest may attempt to access a guest address mapped to a memory space corresponding to the virtual device. The associated CPU typically translates the guest address to a hypervisor address by "walking" through page table entries of a host page table located in the host memory. In the host page table, entries for guest addresses mapped to a memory space of the virtual device are typically marked as invalid, or reserved, to prevent the guest from directly accessing such addresses and, subsequently, trigger an exit to the hypervisor. Consequently, the results of this relatively computationally-expensive page walk are not stored ("cached") by the CPU, and the page walk has to be re-executed on each access of the virtual device by the guest.

In addition, on exit to the hypervisor, the CPU typically provides the hypervisor with only the guest address that the guest attempted to access. The hypervisor then executes an additional lookup operation in a data structure to identify the associated input/output (I/O) instruction(s) to be executed by the hypervisor on behalf of the guest. Since all devices using MMIO in the virtual machine on which the guest is running should have an entry in this data structure, the data structure could be very large so the lookup operation could be computationally expensive. Thus, each time a guest attempts to access a virtual device, multiple computationally expensive table lookup operations are executed, even if the guest accesses the same virtual device repeatedly.

Aspects of the present disclosure address the above noted and other deficiencies by implementing page table entry caching for virtual device emulation. In particular, the hypervisor can create a new type of host page table entry associated with MMIO-based memory space of a virtual device. Instead of marking the page table entry for a guest address mapped to memory space of a virtual device as non-present or reserved (as was done in prior solutions), this new type of entry may be marked as a "hypervisor exit entry" to facilitate a hypervisor exit as well as allow the CPU to cache the page table entry in a translation lookaside buffer (TLB) to avoid the overhead of page table lookup operations. A TLB is a cache that memory management hardware uses to improve virtual address translation speed. Additionally, instead of storing the host address associated with the guest address in the page table, the hypervisor may store the I/O instruction information in the hypervisor exit entry. Thus, when the CPU encounters a hypervisor exit entry, it can pass the I/O instruction information to the hypervisor and eliminate the additional data structure lookup operations that may typically be used.

In an illustrative example, a hypervisor can configure a page table entry in a host page table to map an address associated with MMIO for a virtual device of a guest of the hypervisor to an input/output (I/O) instruction, where the page table entry is to be stored in a translation lookaside buffer (TLB) responsive to the guest attempting to access (e.g., read from or write to) the address. The hypervisor can mark the page table entry as a hypervisor exit entry. Subsequently, the hypervisor may detect an exit to the hypervisor caused by the guest attempting to access (e.g., read from or write to) the address from the page table entry marked as the hypervisor exit entry. Responsive to detecting the exit, the hypervisor may receive from the CPU the I/O instruction in the page table mapped to the address that caused the exit. The hypervisor may then execute the I/O instruction on behalf of the guest.

Accordingly, aspects of the present disclosure dramatically improve hypervisor performance by reducing table lookups typically involved with virtual device operations. Marking a page table entry as a hypervisor exit entry can facilitate the hypervisor exit needed to perform the I/O instruction without marking the table entry as invalid. Thus, the table entry may be stored in the TLB which effectively eliminates performing page table lookups each time a guest attempts to access (e.g., read from or write to) that address. Moreover, by storing the I/O instruction in the page table, additional lookups that would otherwise be needed to identify and execute the I/O instruction may be eliminated. Accordingly, the performance of MMIO instruction execution for virtual devices can be dramatically improved because fewer computing resources may be needed for each instruction.

FIG. 1 depicts a high-level component diagram of an illustrative example of a computer system 100, in accordance with one or more aspects of the present disclosure. Other architectures for computer system 100 are possible, and implementations of a computer system utilizing examples of the present disclosure are not limited to the specific architecture depicted by FIG. 1.

As shown in FIG. 1, the computing system 100 hosts a virtual machine (VM) 105. The virtual machine 105 runs a guest (e.g., guest 110) that uses a guest operating system 115 to manage its resources. The virtual machine 105 may run the same or different guest operating systems, such as Microsoft Windows®, Linux®, Solaris®, Mac® OS, etc. The computing system 100 may be a server, a workstation, a personal computer (PC), a mobile phone, a palm-sized computing device, a personal digital assistant (PDA), etc.

Throughout the following description, the term "guest" refers to the computer readable instructions that run on the hypervisor that is installed on a disk, loaded into memory, or currently running. A guest may include one or more of the following: a firmware copy in memory, an operating system, additional installed applications, a browser, applications running on the browser, etc. The term "virtual machine" (VM) refers to part of a host system that is visible to the guest. A virtual machine may include one or more of the following: memory, virtual CPU, virtual devices (e.g., emulated NIC or disk), physical devices over which a guest is given partial of full control, firmware such as Basic Input/Output System (BIOS), Extensible Firmware Interface (EFI) and Advanced Configuration and Power interface (ACPI) which is provided to the guest 110, etc.

In one example, the computing system 100 runs a hypervisor 145 to virtualize or expose access to underlying host hardware (e.g., the physical devices 165a-165n) of a host 130, making the use of the virtual machine 105 transparent to the guest 110 and the users of the computing system 100. In one example, the hypervisor 145 may support the virtual machine 105. In one example, the hypervisor 145 is part of a host operating system (OS) 140 of the host 130.

In some implementations, the computing system 100 may also include hardware components (host hardware) including a host central processing unit (CPU) 135. The computing system 100 may also include host memory (not shown) and physical devices 165a-165n. In a virtualized environment, a virtual machine 105 may not have direct access to the physical devices 165a-165n.

Access to or emulation of a physical device (e.g., 165a) may be indirectly handled by the intervening hypervisor 145. The guest 110 may be configured to load device-specific modules (guest device drivers) 120a-120n associated with one or more virtual devices 155a-155n. The hypervisor 145 is configured to emulate (e.g., provide the guest 115 with access to) the one or more virtual devices 155a-155n in cooperation with the guest device drivers 120a-120n residing on the virtual machine 105.

When the virtual device 155a-155n is loaded in the guest 110, corresponding guest device drivers 120a-120n are installed in the guest 110. For example, one device driver (e.g., 120a) may be configured to transmit packets to an external network (not shown, e.g., the Internet). Another device driver (e.g., 120b, 120n) may be responsible for writing data or reading data, respectively, outside of the virtual machine 105. When the guest 110 is loaded with a virtual device 155a-155n that includes corresponding MMIO memory pages, the guest 110 is informed about an identifier (ID) of the virtual device. The corresponding device driver(s) 120a-120n for the virtual device 155a-155n that are loaded in the guest 110 may create the writable mappings for the MMIO memory pages of the virtual device 155a-155n.

Once the virtual device 155a-155n is loaded in the guest 110, the guest 110 may inform the hypervisor 145, and specifically the MMIO page table manager 150 of hypervisor 145, of one or more guest page addresses of the MMIO memory pages of the virtual device 155a-155n. In some implementations, the guest 110 may also provide data and length corresponding to the guest page addresses of the MMIO memory pages of the virtual device 155a-155n.

In some implementations, the received guest page addresses may be used to identify an additional set of memory locations associated with the received addresses. The additional set of memory locations may correspond to one or more general purpose registers. The one or more general purpose registers may store an indication of a type of MMIO instruction to execute. The one or more general purpose registers may further store additional information about the MMIO instruction. The additional information may comprise an MMIO address associated with an MMIO-based device or one or more parameters associated with the MMIO instruction.

For each received guest page address associated with MMIO memory pages of the virtual device 155a-155n, the MMIO page table manager 150 may configure the corresponding host page table entry (PTE) in the page table 126 as a "hypervisor exit entry" (e.g., hypervisor exit entry 128). The hypervisor exit entry may be configured to cause CPU 135 to both issue an exit and store the hypervisor exit entry 126 in TLB 137 when guest 110 attempts to access (e.g., read from or write to) the address associated with the hypervisor exit entry 126. In some implementations, MMIO page table manager 150 may set a flag or one of the reserve bits (or flags) of the page table entry to a value that indicates to CPU 135 that the page table entry is a hypervisor exit entry. MMIO page table manager 150 may also store in the page table entry the information associated with the I/O instruction to be executed when the guest accesses (e.g., reads from or writes to) the address. MMIO page table manager 150 may then provide a notification to CPU 135 that the hypervisor exit entry capability has been enabled. For example, MMIO page table manager 150 may set a control flag in an address space accessible to CPU 135 that indicates to CPU 135 that the hypervisor exit entry capability has been enabled. CPU 135, upon detecting the control flag, can then determine that that hypervisor exit entry capability has been enabled, and subsequently cache the page table entry with the reserve bits (or flags) in the TLB 137.

When the guest 110 attempts to access a virtual device (e.g., 155a) using an MMIO-based instruction, the guest 110 may attempt to access a guest address mapped to a memory space of the virtual device (e.g., 155a). The host CPU 135 accesses the page table entry for the address, and responsive determining that the appropriate flag is set on the entry to indicate that the entry has been marked as a hypervisor exit entry, CPU 135 can issue an exit to the hypervisor. Additionally, CPU 135 may cache the page table entry for the hypervisor exit entry in TLB 137 to avoid the overhead of future page lookups for the address.

When the guest 110 attempts to access the address that causes the exit from the guest 110 to the hypervisor 145, the hypervisor 145 receives the address that caused the fault. In some implementations, the hypervisor 145 may also receive the I/O instruction to be performed on the virtual device or a physical device. CPU 135 can obtain the I/O instruction from the hypervisor exit entry in the page table and pass it to MMO page table manager 150 when the exit is performed. Thus, MMIO page table manager 150 should no longer need to perform any additional lookups to determine the I/O instruction to execute, thus reducing the lookup overhead. The MMIO page table manager 150 may then execute the identified instruction on behalf of the guest 110 using the identified I/O instruction from the page table entry.

Figure 2:
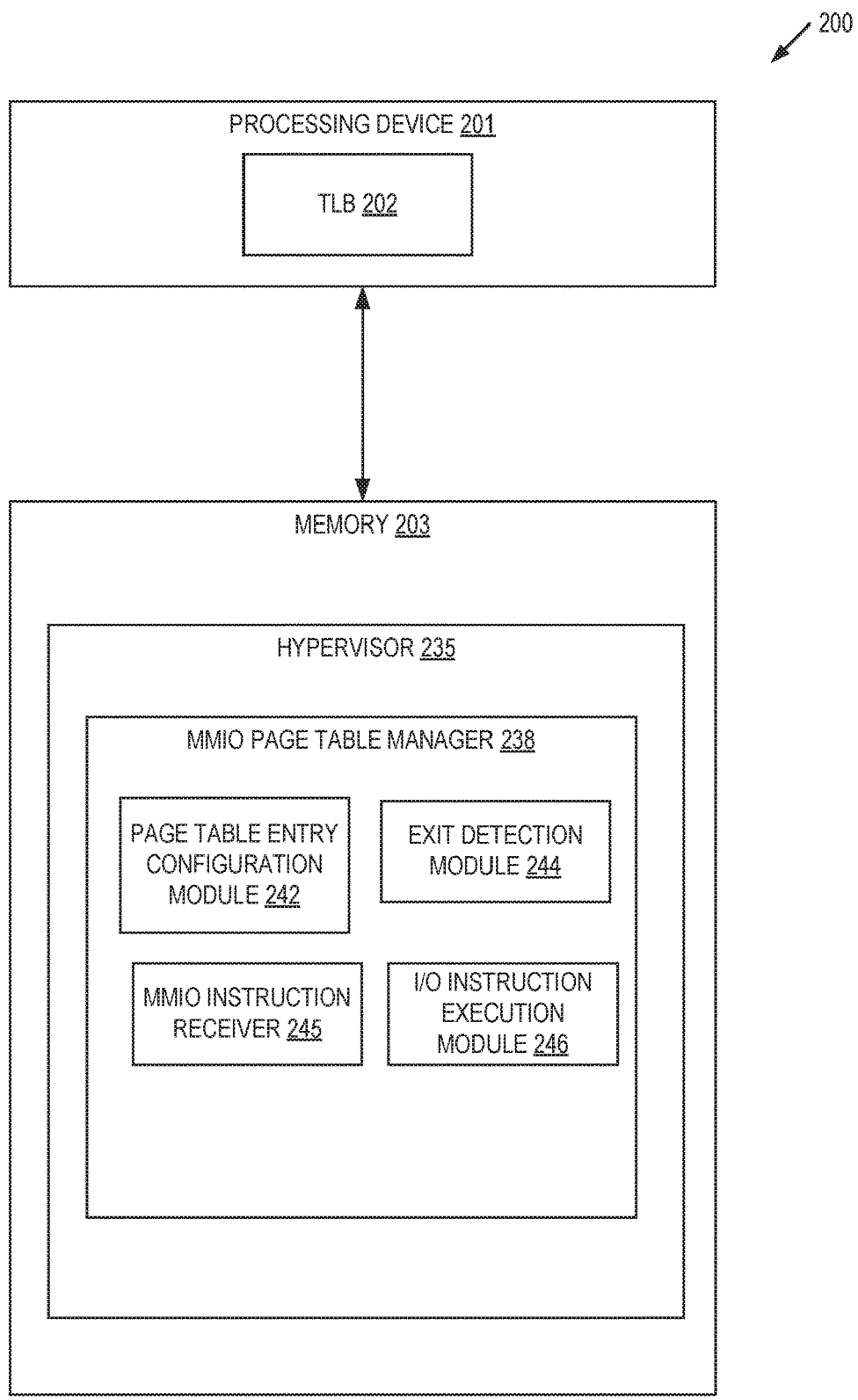
FIG. 2 depicts a block diagram illustrating an example of an MMIO page table manager for facilitating page table entry caching for virtual device emulation, in accordance with one or more aspects of the present disclosure.

FIG. 2 depicts a block diagram illustrating an example a MMIO page table manager 238 for facilitating page table entry caching for virtual device emulation. In some implementations, MMIO page table manager 238 may correspond to MMIO page table manager 150 of FIG. 1. As shown in FIG. 2, MMIO page table manager 238 may be a component of a computing apparatus 200 that includes a processing device 201, operatively coupled to a memory 203, to execute a hypervisor 235. In some implementations hypervisor 235 may correspond to hypervisor 145 of FIG. 1. In some implementations, processing device 201 and memory 203 may correspond to processing device 502 and main memory 504 respectively as described below with respect to FIG. 5.

MMIO page table manager 238 may include page table entry configuration module 242, MMIO instruction receiver 245, and I/O instruction execution module 246. Alternatively, the functionality of one or more of page table entry configuration module 242, MMIO instruction receiver 245, and I/O instruction execution module 246 may be combined into a single module or divided into multiple sub-modules.

In some implementations, MMIO page table manager 238 may also include MMIO information receiver (not shown) that is responsible for receiving MMIO information to be stored in a page table entry as noted above with respect to FIG. 1. MMIO information receiver can receive the address associated with the MMIO for a virtual device of a guest of hypervisor 235 and the I/O instruction to be executed by the hypervisor when the guest attempts to access (e.g., read from or write to) the MMIO address. In some implementations, MMIO information receiver receives this information from the guest during guest initialization.

Alternatively, MMIO information receiver receives this information from hypervisor 235 directly when a physical device is detected and subsequently exposed to the guest. In such cases, the hypervisor 235 may identify the physical device, determine the MMIO address and an associated I/O instruction in view of attributes associated with the physical device. For example, the hypervisor 235 may receive the I/O instruction information when the physical device is added to the system. MMIO information receiver 241 may then send a notification to the guest with the MMIO information.

Once the MMIO information has been received, MMIO page table manager 238 may invoke page table entry configuration module 242 to create page table entries in a host page table for each of the MMIO addresses and mark them as hypervisor exit entries. As noted above, a page table entry in the host page table that is marked as a hypervisor exit entry can indicate to processing device 201 to, in response to a guest attempting to access (e.g., read from or write to) the MMIO address in the entry, store the page table entry in translation lookaside buffer (TLB) 202, as well as issue a hypervisor exit to facilitate the execution of the associated I/O instruction. In some implementations, page table entry configuration module 242 may be invoked to create the hypervisor exit entry during initialization of the guest. Alternatively, page table entry configuration module 242 may be invoked to create the hypervisor exit entry responsive to a guest attempt to access (e.g., read from or write to) the MMIO address for the first time.

In some implementations, page table entry configuration module 242 may utilize one of the reserve bits in the table entry to mark the entry as a hypervisor exit entry. Alternatively, page table entry configuration module 242 may store a dedicated flag to mark the entry as a hypervisor exit entry. Page table entry configuration module 242 may mark the entry as a hypervisor exit entry by setting the reserve bits or dedicated flag to a particular value (e.g., '0' for normal entry, '1' for hypervisor exit entry, etc.) Marking a page table entry as a hypervisor exit entry can signal to the processing device 201 that the entry is valid (and should be stored in the TLB 202), and that it should also cause a hypervisor exit when a guest attempts to access (e.g., read from or write to) the associated address (which is typically done only for invalid entries or entries marked as read only or not-available).

Instead of storing a host address in the hypervisor exit entry, page table entry configuration module 242 may store the hypervisor exit entry so that it maps the MMIO address for the virtual device to the I/O instruction associated with that address. Thus, processing device 201, upon detecting that the entry is a hypervisor exit entry may return the I/O instruction to the hypervisor to avoid additional lookup overhead.

In some implementations, MMIO page table manager 238 may then provide a notification to processing device 210 to enable hypervisor exit entry capability for the hypervisor 235. In implementations, where page table entry configuration module 242 utilizes reserve bits to mark the page table entry as a hypervisor exit entry, processing device 201 may need to be notified that the reserve bits indicate that the page table entry should cause a hypervisor exit as well as cause processing device 201 to store the hypervisor exit entry in TLB 202. Thus, processing device 201 can continue to support legacy hypervisors without hypervisor exit entry capability at the same time as those hypervisors that support the capability.

In response to a guest attempting to access (e.g., read from or write to) an MMIO address, processing device 201 may access the host page table entry for the address. If the table entry is marked as a hypervisor exit entry, processing device 201 may store the table entry in TLB 202 and issue a hypervisor exit. Exit detection module 244 may detect the hypervisor exit caused by the guest attempting to access (e.g., read from or write to) the MMIO address in the hypervisor exit entry (e.g., when the guest executes an MMIO instruction that access that address), and may subsequently invoke MMIO instruction receiver 245 to receive the I/O instruction mapped to the MMIO address that caused the exit. Since the I/O instruction is stored in the page table instead of a host address translation, when processing device 201 issues the exit, it may pass the I/O instruction to MMIO instruction receiver 245. I/O instruction execution module 246 may then be invoked to execute the I/O instruction in the hypervisor exit entry.

Figure 3:
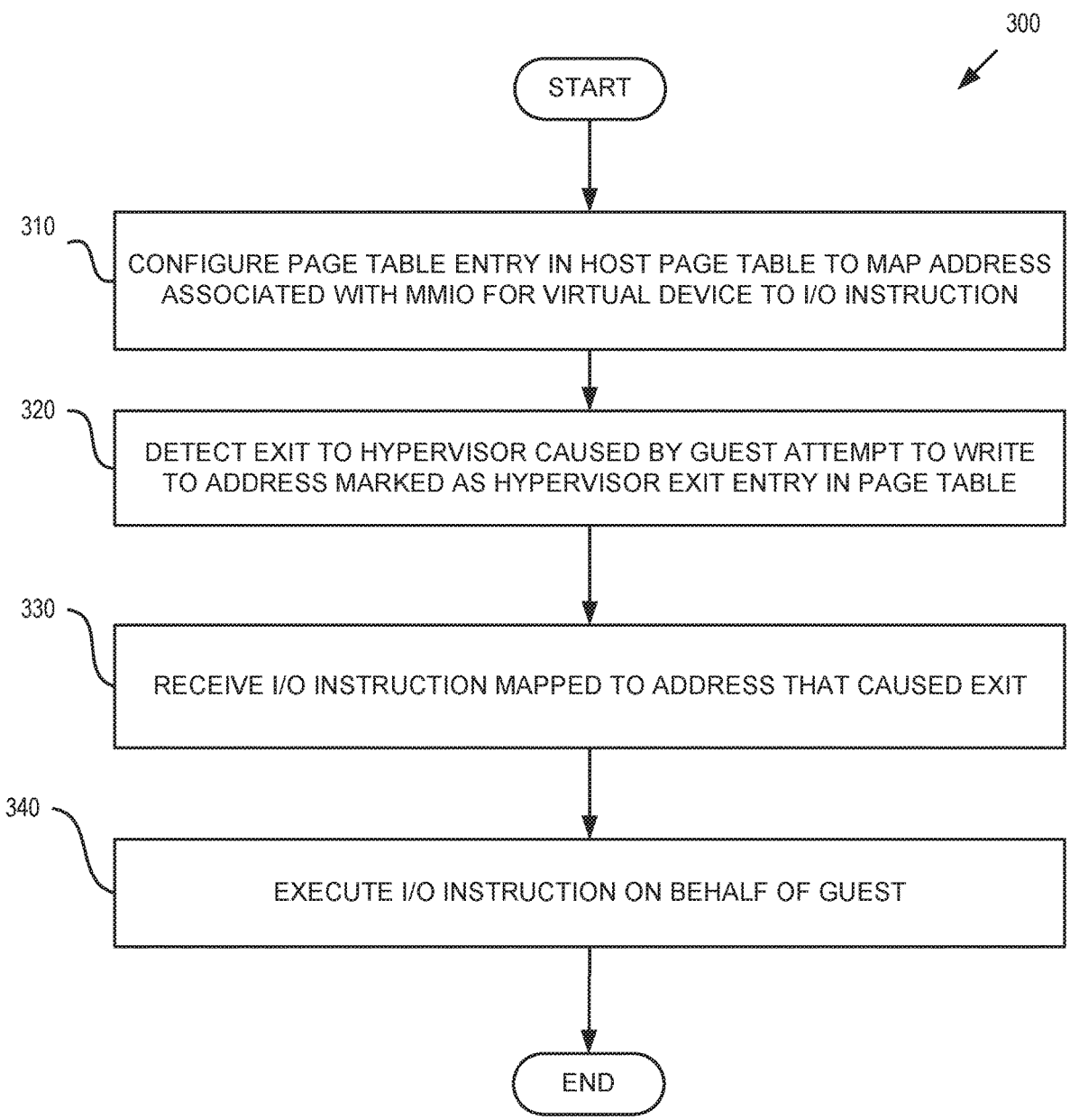
FIG. 3 depicts a flow diagram of a method for page table entry caching for virtual device emulation, in accordance with one or more aspects of the present disclosure.

FIG. 3 depicts a flow diagram of an example method 300 for page table entry caching for virtual device emulation. The method may be performed by processing logic that may comprise hardware (circuitry, dedicated logic, etc.), computer readable instructions (run on a general purpose computer system or a dedicated machine), or a combination of both. In one illustrative example, method 300 may be performed by MMIO page table manager 150 of hypervisor 145 in FIG. 1. Alternatively, some or all of method 300 might be performed by another module or machine. It should be noted that blocks depicted in FIG. 3 could be performed simultaneously or in a different order than that depicted.

At block 305, processing logic configures a page table entry in a host page table to map an address associated with MMIO for a virtual device of a guest of a hypervisor to an input/output (I/O) instruction. In some implementations, the page table entry is marked as a hypervisor exit entry to cause, responsive to the guest attempting access (e.g., read from or write to) the address in the page table entry, an exit to the hypervisor. At block 310, processing logic detects an exit to the hypervisor caused by the guest attempting to access (e.g., read from or write to) the address in the page table entry marked as the hypervisor exit entry. At block 315, responsive to detecting the exit, processing logic receives the I/O instruction mapped to the address that caused the exit. At block 320, processing logic executes the I/O instruction on behalf of the guest. After block 320, the method of FIG. 3 terminates.

Figure 4:
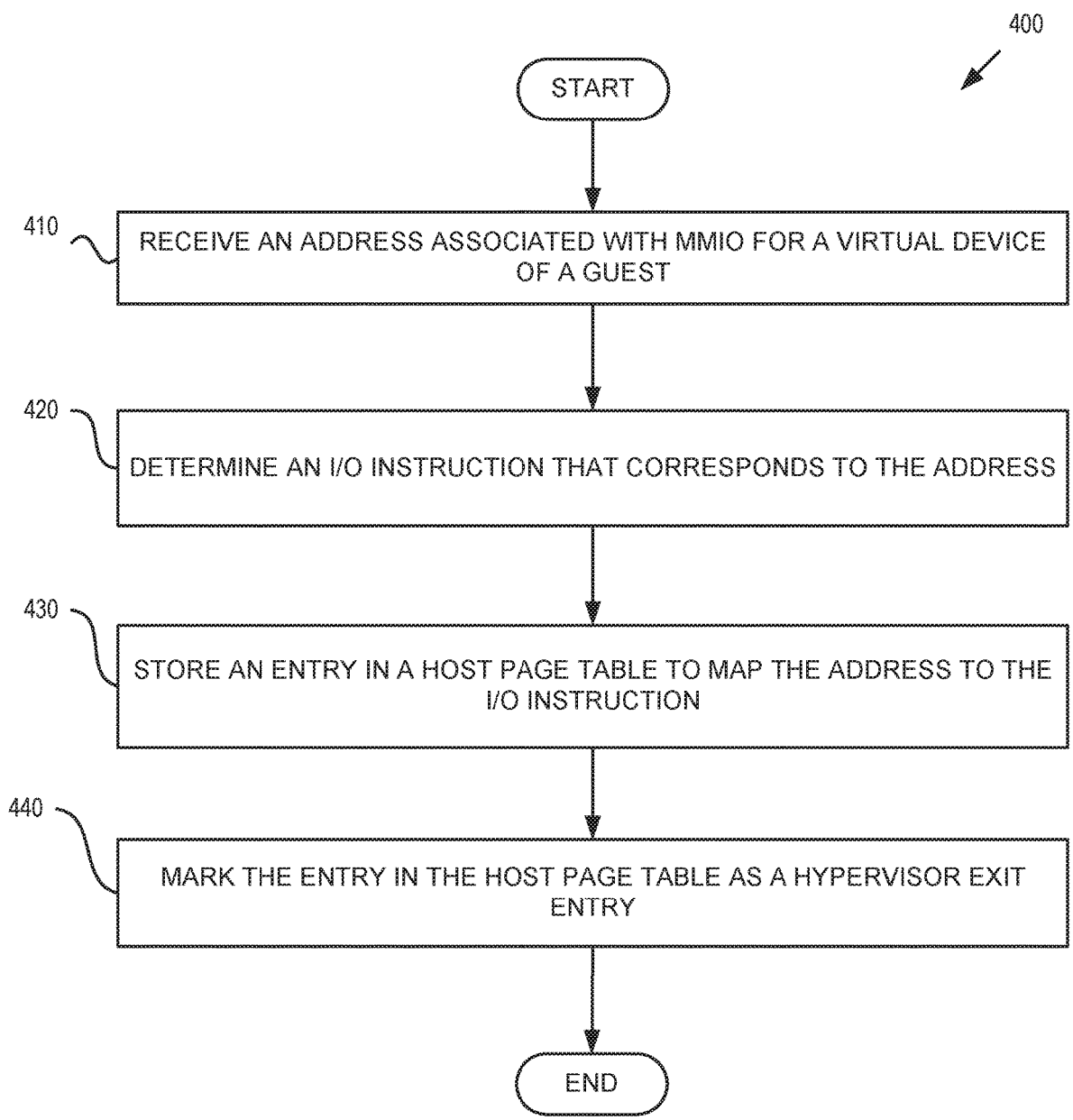
FIG. 4 depicts a flow diagram of a method for configuring an entry in a host page table as a hypervisor exit entry, in accordance with one or more aspects of the present disclosure.

FIG. 4 depicts a flow diagram of an example method 400 for configuring an entry in a host page table as a hypervisor exit entry. The method may be performed by processing logic that may comprise hardware (circuitry, dedicated logic, etc.), computer readable instructions (run on a general purpose computer system or a dedicated machine), or a combination of both. In one illustrative example, method 400 may be performed by MMIO page table manager 150 of hypervisor 145 in FIG. 1. Alternatively, some or all of method 400 might be performed by another module or machine. It should be noted that blocks depicted in FIG. 4 could be performed simultaneously or in a different order than that depicted.

At block 410, processing logic receives an address associated with memory-mapped input-output (MMIO) for a virtual device of a guest of a hypervisor. In some implementations, processing logic may receive the address from the guest. Alternatively, processing logic may determine the address in view of the physical device associated with the virtual device.

At block 420, processing logic determines an I/O instruction that corresponds with the address. In some implementations, processing logic may receive the I/O instruction from the guest. Alternatively, processing logic may determine the I/O instruction in view of attributes associated with the physical device. At block 430, processing logic stores an entry in a host page table to map the address to the I/O instruction.

At block 440, processing logic marks the entry in the host page table entry as a hypervisor exit entry, wherein the hypervisor exit entry is to cause, when the guest attempts to access (e.g., read from or write to) the address, an exit to the hypervisor and the page table entry to be stored in a translation lookaside buffer (TLB). In some implementations, processing logic marks the entry as a hypervisor exit entry by setting a flag in the page table entry to a value that indicates that the page table entry is valid and that an attempt by the guest to access (e.g., read from or write to) the address in the page table entry is to cause the exit. Alternatively, processing logic marks the entry as a hypervisor exit entry by setting one or more reserve bits in the page table entry. After block 440, the method of FIG. 4 terminates.

Figure 5:
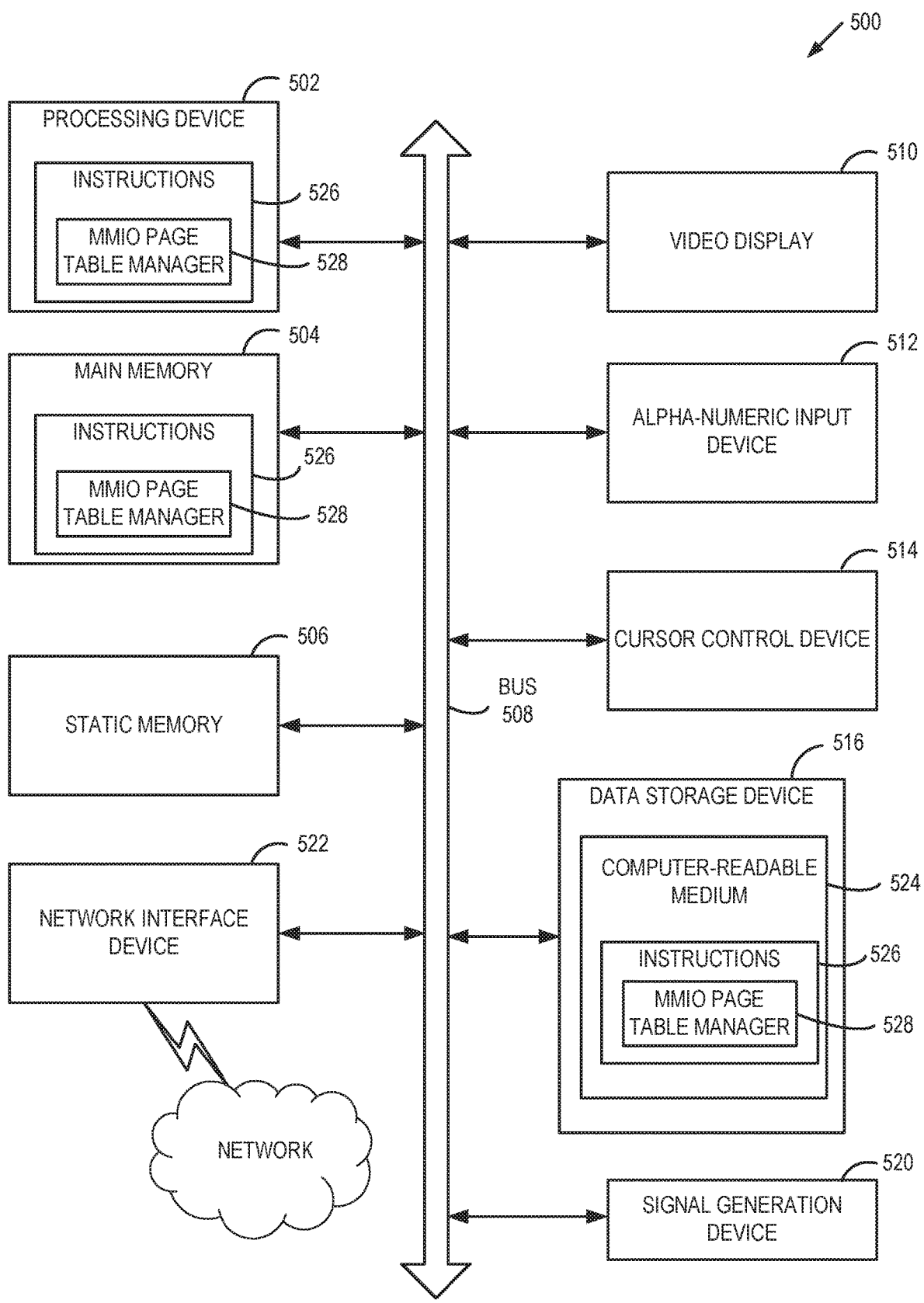
FIG. 5 depicts a block diagram of an illustrative computer system operating in accordance with one or more aspects of the present disclosure.

FIG. 5 depicts an example computer system 500 which can perform any one or more of the methods described herein. In one example, computer system 500 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while a single computer system is illustrated, the term "computer" shall also be taken to include any collection of computers that individually or jointly execute a set (or multiple sets) of instructions to perform any one or more of the methods discussed herein.

The exemplary computer system 500 includes a processing device 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute processing logic (e.g., instructions 526) that includes MMIO page table manager 528 for performing the operations and steps discussed herein (e.g., corresponding to the methods of FIGS. 3-4, etc.).

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker). In one illustrative example, the video display unit 510, the alphanumeric input device 512, and the cursor control device 514 may be combined into a single component or device (e.g., an LCD touch screen).

The data storage device 516 may include a non-transitory computer-readable medium 524 on which may store instructions 526 that include MMIO page table manager 528 (e.g., corresponding to the methods of FIGS. 3-4, etc.) embodying any one or more of the methodologies or functions described herein. MMIO page table manager 528 may also reside, completely or at least partially, within the main memory 504 and/or within the processing device 502 during execution thereof by the computer system 500, the main memory 504 and the processing device 502 also constituting computer-readable media. MMIO page table manager 528 may further be transmitted or received over a network via the network interface device 522.

While the computer-readable storage medium 524 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that aspects of the present disclosure may be practiced without these specific details. In some instances, well-known structures and devices are shown in block diagram form, rather than in detail, in order to avoid obscuring the present disclosure.

Unless specifically stated otherwise, as apparent from the following discussion, it is appreciated that throughout the description, discussions utilizing terms such as "configuring," "detecting," "receiving," "executing," "determining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the specific purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Aspects of the disclosure presented herein are not inherently related to any particular computer or other apparatus. Various general purpose systems may be used with programs in accordance with the teachings herein, or it may prove convenient to construct more specialized apparatus to perform the specified method steps. The structure for a variety of these systems will appear as set forth in the description below. In addition, aspects of the present disclosure are not described with reference to any particular programming language. It will be appreciated that a variety of programming languages may be used to implement the teachings of the disclosure as described herein.

Aspects of the present disclosure may be provided as a computer program product that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not have an ordinal meaning according to their numerical designation.

What is claimed is:

1. A method, comprising:
    configuring, by a processing device executing a hypervisor, a page table entry in a host page table to map a guest address associated with memory-mapped input-output (MMIO) for a virtual device of a guest of the hypervisor to an input-output (I/O) instruction, wherein the I/O instruction is stored in the page table entry in lieu of a host address associated with the guest address;
    setting, by the processing device executing the hypervisor, a reserve bit in the page table entry to mark the page table entry as a hypervisor exit entry, wherein marking the page table entry as the hypervisor exit entry causes the page table entry to signal to the processing device that the page table entry is valid and to be stored in a translation lookaside buffer (TLB) responsive to the guest attempting to access the guest address;

detecting, by the processing device executing the hypervisor, an exit to the hypervisor caused by the guest attempting to access the guest address in the page table entry marked as the hypervisor exit entry;

responsive to detecting the exit, receiving, by the processing device executing the hypervisor, the I/O instruction in the host page table, the received I/O instruction mapped to the guest address that caused the exit; and executing, by the processing device executing the hypervisor, the I/O instruction on behalf of the guest.

2. The method of claim 1, wherein configuring the page table entry comprises:

receiving the guest address associated with the MMIO and the I/O instruction from the guest; and storing the guest address with the I/O instruction in the page table entry.

3. The method of claim 1, wherein configuring the page table entry comprises:

identifying a physical device to be associated with the virtual device;

determining the guest address associated with the MMIO and the I/O instruction in view of attributes associated with the physical device;

storing the guest address with the I/O instruction in the page table entry; and sending a notification to the guest with the guest address and the I/O instruction.

4. The method of claim 1, wherein the page table entry is configured during initialization of the guest.

5. The method of claim 1, wherein the page table entry is configured responsive to the guest attempting to access the guest address for a first time.

6. The method of claim 1, wherein marking the page table entry indicates to the processing device that the guest writing to the guest address is to cause the exit.

7. The method of claim 6, further comprising:

providing a notification that a value for the reserve bit indicates that the page table entry is to cause the exit.

8. A computing apparatus comprising:

a memory; and a processing device, operatively coupled to the memory, to execute a hypervisor to:

configure a page table entry in a host page table to map a guest address associated with memory-mapped input-output (MMIO) for a virtual device of a guest of the hypervisor to an input-output (I/O) instruction, wherein the I/O instruction is stored in the page table entry in lieu of a host address associated with the guest address;

set a reserve bit in the page table entry to mark the page table entry as a hypervisor exit entry, wherein to mark the page table entry as the hypervisor exit entry causes the page table entry to signal to the processing device that the page table entry is valid and to be stored in a translation lookaside buffer (TLB) responsive to the guest attempting to access the guest address;

detect an exit to the hypervisor caused by the guest attempting to access the guest address in the page table entry marked as the hypervisor exit entry;

responsive to detecting the exit, receive the I/O instruction in the host page table, the received I/O instruction mapped to the guest address that caused the exit; and execute the I/O instruction on behalf of the guest.

9. The computing apparatus of claim 8, wherein the page table entry is stored in the TLB when the guest accesses the guest address.

10. The computing apparatus of claim 9, wherein to configure the page table entry the processing device is to:

receive the guest address associated with the MMIO and the I/O instruction from the guest; and store the guest address with the I/O instruction in the page table entry.

11. The computing apparatus of claim 9, wherein to configure the page table entry the processing device is to:

identify a physical device to be associated with the virtual device;

determine the guest address associated with the MMIO and the I/O instruction in view of attributes associated with the physical device;

store the guest address with the I/O instruction in the page table entry; and send a notification to the guest with the guest address and the I/O instruction.

12. The computing apparatus of claim 8, wherein the page table entry is configured during initialization of the guest.

13. The computing apparatus of claim 8, wherein the page table entry is configured responsive to the guest attempting to access the guest address for a first time.

14. The computing apparatus of claim 8, wherein marking the page table entry indicates to the processing device that the guest writing to the guest address is to cause the exit.

15. The computing apparatus of claim 14, wherein the processing device is further to notifying the processing device that a value for the reserve bit indicates that the page table entry is to cause the exit.

16. A non-transitory computer readable storage medium, having instructions stored therein, which when executed by a processing device of a computer system, cause the processing device to:

receive, by the processing device executing a hypervisor, a guest address associated with memory-mapped input-output (MMIO) for a virtual device of a guest of the hypervisor;

determine an input/output (I/O) instruction that corresponds with the guest address;

store an entry in a host page table to map the guest address to the I/O instruction; and set a reserve bit in the entry to mark the entry in the host page table as a hypervisor exit entry, wherein marking the hypervisor exit entry is to cause an exit to the hypervisor and the page table entry to signal to the processing device that the page table entry is valid and to be stored in a translation lookaside buffer (TLB) responsive to the guest attempting to access the guest address.

17. The non-transitory computer readable storage medium of claim 16, wherein marking the entry indicates that the guest writing to the guest address is to cause the exit.

18. The non-transitory computer readable storage medium of claim 17, wherein the processing device is further to:

provide a notification that a value for the reserve bit indicates that the page table entry is to cause the exit.

19. The non-transitory computer readable storage medium of claim 16, wherein to receive the guest address, the processing device is to receive the guest address from the guest.

\* \* \* \* \*